United States Patent [19]

Walsh et al.

[11] Patent Number: 4,890,316

[45] Date of Patent: Dec. 26, 1989

[54] MODEM FOR COMMUNICATING AT HIGH SPEED OVER VOICE-GRADE TELEPHONE CIRCUITS

[76] Inventors: Dale M. Walsh, 7981 Creekwood Drive, Burr Ridge, Ill. 60525; Clifford H. Wallach, 53 Berwick Ct., Lincolnshire, Ill. 60015

[21] Appl. No.: 264,792

[22] Filed: Oct. 28, 1988

[51] Int. Cl.$^4$ .......................................... H04M 11/00
[52] U.S. Cl. ...................................... 379/98; 370/30; 375/8
[58] Field of Search ................. 370/30, 31, 24; 375/8, 375/9, ; 379/98, 97, 96, 93

[56] References Cited

U.S. PATENT DOCUMENTS

| | | | |
|---|---|---|---|
| 4,069,392 | 1/1978 | Goldenberg et al. | 379/98 |
| 4,597,073 | 6/1986 | Staples | 370/30 |
| 4,620,294 | 10/1986 | Leung et al. | 379/98 |
| 4,756,007 | 7/1988 | Qureshi et al. | 375/8 |
| 4,799,214 | 1/1989 | Kaku | 370/30 |

*Primary Examiner*—Jin F. Ng
*Assistant Examiner*—Bonita Lewis
*Attorney, Agent, or Firm*—Allegretti & Witcoff, Ltd.

[57] ABSTRACT

A modem for connecting data terminal equipment (DTE) to a remote DTE via the general switched telephone network or leased lines at data rates of 300, 1200 and 2400 bps using standard modulation techniques, and additionally providing virtual full duplex transmission capability at 9600 bps using trellis code modulation (TCM). The high-speed 9600 bps path is implemented by asymmetrical frequency division of the available bandwidth into a high speed, wideband forward channel (9600 bps) and a low speed, narrowband backchannel (300 bps). The high speed transmitting channel is assigned to that modem having the greatest data demand and the direction is dynamically reversed whenever the amount of data awaiting transmission over the low speed channel exceeds a predetermined maximum backlog, provided that a direction reversal has not taken place for at least a specified minimum interval during which use of the forward channel is guaranteed. The transmission speed of the high speed channel is adaptively adjusted in response to changes in the quality of the data link provided by the dial up telephone facility. Cyclic redundancy checking is used to monitor error rates and failed retraining attempts are also used to indicate the need for lower transmission speeds. The trellis decoding algorithm generates a metric value which is used during high speed transmission to indicate when a speed up should be attempted, and the equalization eyescatter signal is used for the same purpose when transmission is taking place at 4800 baud when trellis coding is not used. Rate change requests are sent over the low speed backchannel to the high speed channel which then executes a mandatory speed switch.

6 Claims, 5 Drawing Sheets

LD FRAME
| FLAG | 02 | REASON | CRC HI | CRC LO | FLAG |

LT FRAME
| FLAG | 04 | SEQ | DATA | ..... | CRC HI | CRC LO | FLAG |

LA FRAME
| FLAG | 05 | SEQ | CREDIT | CRC HI | CRC LO | FLAG |

LTA FRAME
| FLAG | 08 | LT SEQ | LA SEQ | CREDIT | DATA | .... | CRC HI | CRC LO | FLAG |

NAK FRAME
| FLAG | 03 | SEQ | CREDIT | CRC HI | CRC LO | FLAG |

LN FRAME
| FLAG | 06 | SEQ | TYPE | CRC HI | CRC LO | FLAG |

LNA FRAME
| FLAG | 07 | SEQ | CRC HI | CRC LO | FLAG |

LT1 FRAME
| FLAG | SEQ/9 | DATA | CRC HI | CRC LO | FLAG |

LT2 FRAME
| FLAG | SEQ/A | DATA | DATA | CRC HI | CRC LO | FLAG |

LT3 FRAME
| FLAG | SEQ/B | DATA | DATA | DATA | CRC HI | CRC LO | FLAG |

LTR FRAME
| FLAG | SEQ/C | CRC HI | CRC LO | FLAG |

LTDR FRAME
| FLAG | SEQ/D | CRC HI | CRC LO | FLAG |

LTO FRAME
| FLAG | 04 | SEQ | CRC HI | CRC LO | FLAG |

FIG.5

MODEM FOR COMMUNICATING AT HIGH SPEED OVER VOICE-GRADE TELEPHONE CIRCUITS

SUMMARY OF THE INVENTION

This invention relates to digital communication systems and more particularly to a modem for communicating at high speed over voice-grade, dial-up telephone circuits.

A modem capable of transmitting data at higher speeds offers significant advantages. Long distance telephone charges are reduced because large files can be sent in less time, and the consequent savings can soon exceed the cost of the modem. Less obvious but nonetheless significant savings result from the reduced time spent supervising file transfers and waiting for data which must arrive before other tasks can be begun.

Although arbitrarily high transmission speeds can be attained over special-purpose, wideband transmission circuits, such links are typically unavailable and transmission must accordingly be handled by conventional, voice-grade, dial-up telephone lines. Stuch standard phone lines have severely limited bandwidth, are subject to line noise, and typically exhibit line irregularities and poor termination, making them echo-prone. These factors severely complicate the task of improving modem transmission speeds over dial-up lines.

Better use of the roughly 3,000 Hz bandwidth available on the dial-up network may be realized by using advanced modulation and equalization techniques. The widely used Bell standard 103 modems operate at speeds only up to 300 bps., comfortably within the available bandwidth. The faster, full-duplex Bell 212A type modems use phase modulation and require about half of the available bandwidth for each of the two channels which send data at approximately 1200 bps in both directions simultaneously. Modems capable of operating at 2400-bps, such as those conforming to the CCITT V0.22 bis standard, achieve improved speeds by using a modulation method called "quadrature amplitude modulation" (QAM), in which both the amplitude and phase of the signal are modulated. It would, however, normally be impossible for a 2400-baud QAM modem to simultaneously transmit in both directions at the designed speed over voice-grade lines if a technique, called "adaptive equalization," were not used to automatically adjust the modem to the unique characteristics of each phone line encountered. The 2400-baud transmission speed achieved by adaptively equalized modems is thought to be about the maximum practical speed for truly full-duplex (bidirectional) transmission over non-overlapping, frequency-divided channels in voice-grade phone lines.

It is, however, possible to attain even higher speeds by allowing the channels to overlap. One such scheme is found in the CCITT V0.32 recommendation for a full-duplex 9600-bps modem in which the modem simultaneously receives information over the same passband on which it is transmitting. To make this work, each modem must be able to substantially cancel out the echoes of its own transmitted signal. The echo cancellation mechanism required is exceedingly complex, however, and modem designers have accordingly sought a less costly solution.

One widely adopted approach for avoiding the echo cancellation problem operates the high-speed modem in a half-duplex, one-direction at a time, mode. This method emulates full-duplex (true bidirectional) capabilities by repeatedly switching the transmission direction; that is, by "ping-ponging" the data back and forth over the line, but always in only one direction at any one time. The turn-around time for such a switched half-duplex system is relatively long, however, and makes the compromise unsuitable for many highly interactive applications. Moreover, in a further effort to cut costs, typical "ping-ponging" modems have employed the modulation scheme used in the CCITT V0.29 standard which can be implementeed with relatively inexpensive integrated circuit "chip sets" widely used for facsimile transmission. However, V0.29 modulation is demonstrably inferior to the more advanced "trellis code modulation" (TCM) technique used in the CCITT full-duplex V0.32 standard noted earlier.

The second approach, asymmetrical transmission, is used in the preferred embodiment of the invention to be described. The technique is not limited only to asymmetrical transmission. Asymmetrical transmission is based on the recognition that, while the modem needs to operate interactively in both directions at once, the high-speed data transfers is normally needed in one direction only. When entire files are being transferred from one location to another, a high-speed channel is needed in that direction while, in the other direction, the data to be sent is normally limited to the combination of the interactive data being keyboarded and the error-control signals needed to confirm the accuracy of the transmission occurring in the high-speed direction.

In the preferred modem to be described, simultaneous bi-directional transmission occurs over a wide-band, high-speed channel in one direction had a narrow-band, low-speed backchannel in the reverse direction, and direction of the high-speed channel is dynamically reversed whenever the modem currently transmitting over the backchannel accumulates more that a predetermined maximum backlog of untransmitted data. Because each channel has its own assigned band of frequencies, the modem may distinguish the signals being received from those being transmitted without expensive echo cancellation mechaniams. Since, in typical use, the need for the high-speed transmission exists in only one direction at a time (when a file is to be sent), the dynamically assigned high and low speed channels provided virtual full-duplex capabilities for interactive data while simultaneously providing a high-speed passband for file transfers comparable to that of a "ping-ponging" half-duplex system.

The quality of the communication channel provided by the public dial-up phone network varies. If the connection provided is of superior quality, trellis code modulation can provide the ability to communicate at speeds even greater than 9600 baud. Conversely, if the quality off the link is inferior, error free transmission is possible only at speeds significantly lower than 9600 baud.

It is the principal object of the present invention to adaptively adjust the transmission speed used in the high-speed channel of an asymmetrical transmission system to maximize the transmission rate achievable with communication channels of unpredictable and time-varying quality.

In accordance with a principal feature of the present invention, means are employed at the high-speed receiving modem to monitor the high-speed channel's transmission capability and to transmit, over the low-speed channel to the high speed transmitting modem, a request to alter the high speed transmission rate when the changes in the monitored transmission capability are detected. The mechanism for initiating a speed-up request takes the form of means for monitoring the "metric value" produced by the trellis-code demodulation process and for generating a speed-up request whenever this metric value repeatedly exceeds a predetermined minimum value during a predetermined time interval. An alternative technique is to measure the equalizer's output error signal which is commonly called "eye scatter: rather than the "metric value". The results are essentially equivalent.

In accordance with a further feature of the invention, means are employed at the receiving modem for determining the accuracy of transmission of the blocks of received data (e.g. by cyclic redundancy checking of trademark of Microcom MNP frames, or other error control frames and by checking the accuracy of blocks of the fill characters sent when no MNP error-checking frames are being transmitted) modem. In accordance with this aspect of the invention, the receiving modem verifies the accuracy of the transmission and, in the event more than a predetermined number of data errors are detected with a predetermined time interval, the receiving modem generates a rate change request which is transmitted over the low-speed channel to the high-speed transmitting modem, which responds by reducing the transmission speed of the high-speed channel by a predetermined increment.

A further feature of the invention takes advantage of the adaptive equalization capabilities of the modem. The transmitting and receiving modems are typically provided with the ability to jointly execute adaptive equilization algorithms under which the high-speed transmitting modem sends a predetermined sequence of training data to the receiving modem, and the receiving modem attepts to adjust its operating parameters to best match the characteristics of the available channel. In accordance with this aspect of the invention, the high-speed receiving mechanism in the modem is provided with the ability to generate a fault condition signal when the receiving modem is unable to successfully train at the current speed, and further includes means for transmitting a rate change request over the low-speed channel to the high-speed transmitting modem whenever this falt condition signal is generated.

In accordance with still another feature of the invention, means are employed at the receiving modem to monitor the performance of the trellis modulated decoding process or alternatively the equalizer's output error signal to generate a signal indicative of a transmission channel having capacity in excess of that required for communication at the speed currently in effect, and to generate a request for an increased transmission rate, this request being sent over the low-speed transmission path to the high-speed transmitting modem.

In accordance with a further feature of invention, the high-speed receiving modem further includes means for inhibiting a request for a speed-up whenever a request for a speed redcution has been issued within a prior interval of predetermined duration. In this way, the modem is prevented from issuing an excessive number of new rate requests when the transmission capability of the available channel is near the borderline between two rates.

These and other objects, features and advantages of the present invention may be more clearly understood through a consideration of the following detailed description of a specific embodiment of the invention. In the course of this description, reference will frequently be made to the attached drawings, in which:

BRIEF DESCRIPTION OF THE DRAWINGS

FIG. 5 illustrates the data formats of the various frames used to transmit data under the link protocol used by the modem of FIG. 1, including the data formats of the new rate request sent over the low speed channel, and the new rate command sent over the high speed channel in accordance with the invention.

DETAILED DESCRIPTION

Digital Architecture

Figure 1:
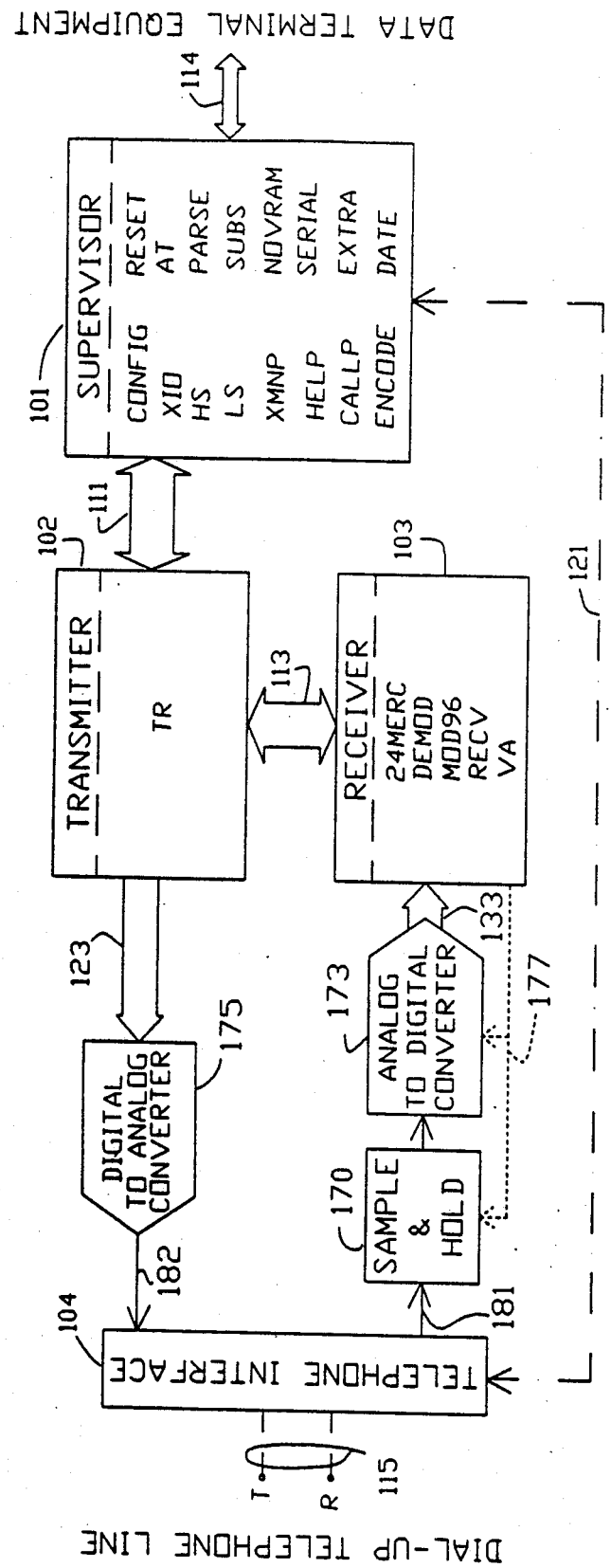
FIG. 1 is a block diagram of a preferred form of an asymmetrical modem of the class which may advantageously utilize the present invention.

FIG. 1 of the drawings is a block diagram illustrating the general hardware architecture of an asymmetrical modem with may advantageously incorporate the adaptive speed control mechanism contemplated by the present invention. That adaptive speed control mechanism, and additional features to be noted below, represent additions to and improvements over the prior ASYMMETRICAL DUPLEX ERROR CONTROLLED MODEM which was described in U.S. patent application Ser. No. 07/115,354 filed Oct. 29, 1987 by Clifford H. Wallach, Robert C. Suffern and Dale M. Walsh.

The present embodiment, like its predecessor, employs three independent digital processors 101, 102 and 103, and an analog telephone interface 104 (which will be described in more detail in connection with FIG. 2 of the drawings). Processor 101, called the "Supervisor", controls both processors 102 and 103. Processor 102, called the "Transmitter", and processor 103, called the "Receiver", both wait for and execute commands from Supervisor 101.

The three processors 101-103 advantageously take the form of available general-purpose microprocessors. Supervisor 101 and Transmitter 102 may be implemented using type 8031 processors supporteed by conventional read-only memory for program storage and by random-access memory for buffering data and for storing process variables. Because of the lighter program storage requirements imposed on Transmitter 102, that processor may be advantageously implemented with a type 8051 processor (which executes the same instruction set as the 8031 but has built-in ROM memory).

Receiver 103 bears the greatest computational burden of the three processors and is preferably implemented with a TMS 32020 high-speed 16-bit arithmetical processor operating at a clock-speed of 19,8144 Mhz. The arithmetic capabilities of this device and its high clock speed allow it to decode a 9600 bps trellis-coded signal when the modem is receiving data at its highest-rated speed. The 8031 which implements Supervisor 101 operates at 14.976 Mhz while the 8051 Transmitter 102 operates at 8.98 Mhz.

The program modules which control the three processors 101–103 have been divided, along essentially functional lines, into the routines indicated in FIG. 1 within the block indicating each processor. The routines which are executed by the Supervisor 101 are called CONFIG, XIO, HS, LS, XMNP, HELP, CALLP, ENCODE, RESET, AT, PARSE, SUBS, NOVRAM, SERIAL, EXTRA ANDD DATE. The Transmitter 102 executes the routine named TR (not further subdivided), and the Receiver 103 performs the routines names 24MERC, DEMOD, MOD96, RECV, and VA. Each of these routines will be described generally below. Commented assembly language at the conclusion of this specification.

The Supervisor 101 and the Transmitter 102 are directly coupled (data port 1 of the 8031 Supervisor processor 101 is wired directly to port 2 by the 8051 Transmitter processor 102) as illustrated by the bus 111 shown in FIG. 1. Data port 1 of the 8051 Transmitter processor 102 is connected to the 8 low-order bit positions of the data port of the TMS 32020 Receiver processor 103 via an interprocessor latch as depicted by the bux 113. This linear topology, with the Transmitter 102 serving as an interface between Supervisor 101 and Receiver 103, provides a high-speed 8-bit parallel (half-duplex) path for all interprocessor transfers and permits the Receiver 103 (a high-speed arithmetic processor) to be directly connected to the Transmitter 102 so that it may be as a slave mathematical processor provided high-speed demodulation filtering functions when the modem is in its high-speed transmit mode.

The use of three conventional microprocessors organized in a linear topology significantly reduces the manufacturing cost of the modem by eliminating the need for special-purpose devices and by minimizing the interconnection circuity needed to allow the plural processors to function together.

Transmitter 102 and Receiver 103 send and receive information to the telephone interface 104 by way of analog-digital conversion circuits. Port 2 of the 8051 Transmitter processor 102 is connected via a parallel bus 123 to the input of a conventional 8-bit digital-to-analog converter (DAC) seen at 175 in FIG. 1. DAC 175 exhibits a settling time of 100 nanoseconds. Telephone interface 104 is connected to the output of the DAC 175 via line 182. The low order 8 bits of the data port of the TMS 32020 Reciever processor 103 are connected via a bus 133 to the output of an analog-to-digital converter (ADC) 173. The ADC 173 receives analog signal samples from sample-and-hold circuit 170 which in turn has its input connected to the telephone interface circuit 104 via line 181. The sample-and-hold circuit 170 employed in the present embodiment has a capture time of 4 microseconds and operates in lock step with the ADC 173, both of which are synchronized by a clocking signal from the Receiver 103 which is supplied via line 177 seen in FIG. 1. The ADC 173 is an 8-bit analog-to-digital converter of conventional design having a conversion time of less than 100 microseconds.

Analog Architecture

Both Transmitter 102 and Receiver 102 are interconnected to the telephone network (normally a conventional two-wire dial-up telephone T and R circuit seen at 115 in FIG. 1) by means of the analog/digital converters 173 and 175, discussed above, and an analog telephone interface 104. The interface 104 operates under the control of, and supplies telephone network status information to, Supervisor 101 via the control link 121 seen in FIGS. 1 and 2.

Figure 2:
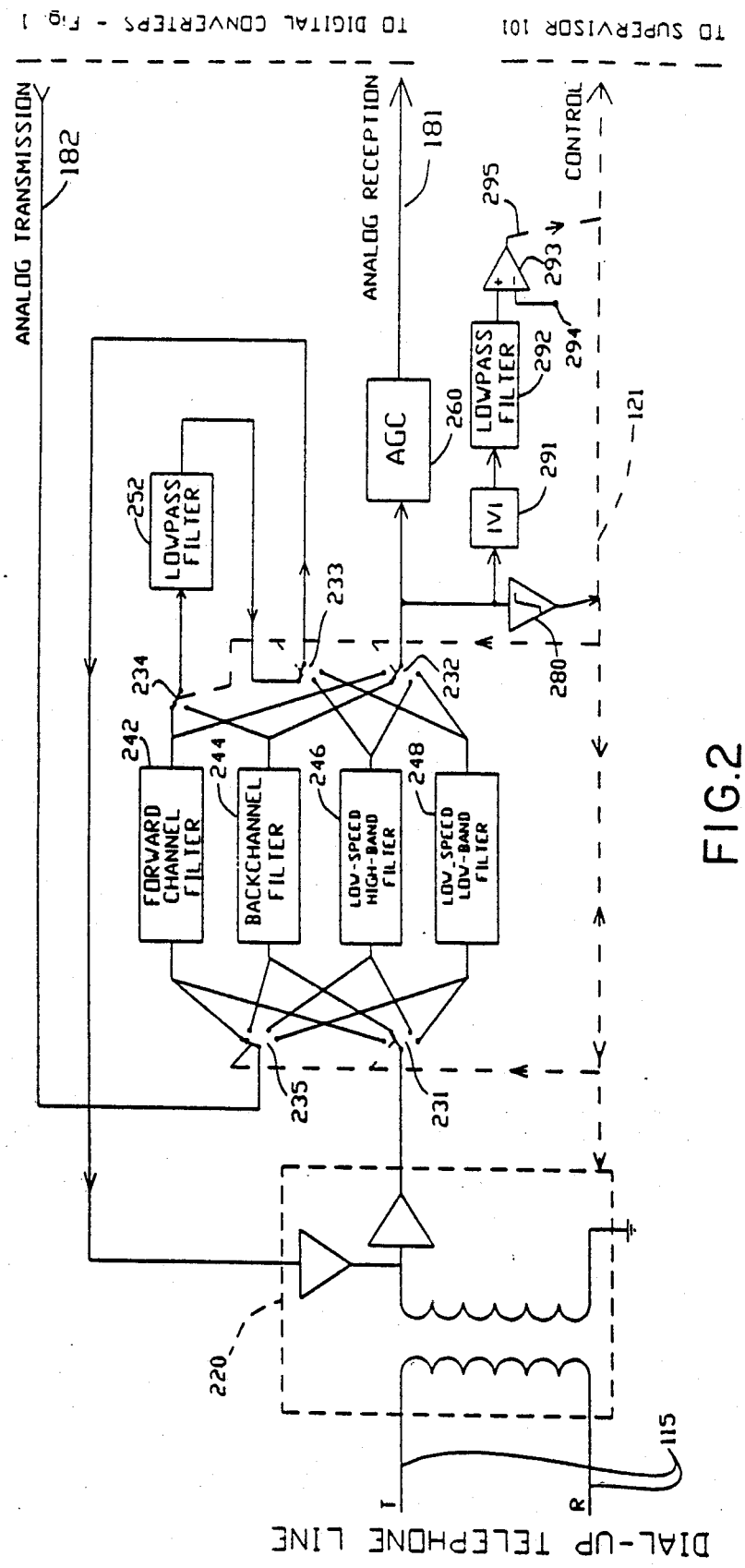
FIG. 2 is depicts in more detail the analog telephone interface used in the modem of FIG. 1.

The analog interface is shown in more detail in the block diagram, FIG. 2, of the drawings. The telephone lines 115 are connected (typically by means of a standard RJ11C phone connector) to a telephone line circuit indicated generally at 220 in FIG. 2. The line circuit 220 includes: a hybrid transformer and amplifiers for separating the transmitted and received signals; a conventional ring detection circuit (not shown) for detecting ringing signals from the central office which appear across the telephone lines 115; and a line relay (not shown) for taking the modem OFF-HOOK (connected) and ON-HOOK (disconnected), and for pulsing the line to provide conventional dial-pulse signalling. The ringing signal is supplied as a network status signal via the control link 121 to the Supervisor 101, and the OFF-HOOK control signal is supplied to the circuit 220 via the same link.

Supervisor 101 provides control signals over the link 121 to control five electronic switches 231–235. These switches connect the appropriate filters between the line circuit 220 and the DAC 175 when the modem is transmitting, or between the line circuit 220 and the ADC 173 when the modem is receiving. Five different filters are used: a wideband, forward channel filter 242 for defining the passband over which data is transmitted at 9600 bps; a narrowband, backchannel filter 244, and high-band and lowband filters 246 and 248 for use at 300, 1200 and 2400 bps. An additional lowpass filter 252 is used to further filter the transmitted forward and back channel signals when the high-speed mode is being used.

The low-speed high and low band filters 246 and 248 are conventional and comply with the CCITT specifications for V0.22. The two filters are employed for transmission at 300, 1200 and 2400 bps, with the lower band being assigned as the transmission channel to the modem which originates the call in the normal fashion.

The filters 242, 244 and 252 provide the asymmetrical frequency division needed to created the high-speed forward channel (9600 bps) and the lower speed (300 bps) backchannel used in the high-speed mode. These filters may be of any conventional design suitable for providing the transfer functions defined by the following equations.

The wideband filter 242 operates as notch filter which suppresses frequencies within the low-frequency passband of the narrow-band backchannel filter 244. The preferred amplitude vs. frequency transfer function $H_1(S)$ for this wideband filter is:

$$H_1(S) = \frac{(S^2 + W_{Z1}^2)(S^2 + W_{Z2}^2)(S + W_{Z3}^2)}{\left(S^2 + W_{P1}\frac{S}{Q_1} + W_{P1}^2\right)\left(S^2 + W_{P2}\frac{S}{Q_2} + W_{P2}^2\right)\left(S^2 + W_{P3}\frac{S}{Q_3} + W_{P3}^2\right)}$$

WHERE
$W_{Z1} = 2\sim(445)$;
$W_{Z2} = 2\sim(396)$;
$W_{Z3} = 2\sim(320)$;
$W_{P1} = 2\sim(568)$;
$Q_1 = 3$;
$W_{P2} = 2\sim(562)$;
$Q_2 = 2$;
$W_{P3} = 2\sim(534)$; and
$Q_3 = 1$.

The preferred narrowband transfer function $H_2(S)$ for the backchannel filter 244 is:

$$H_2(S) = \frac{(S^2 + W_{Z1}^2)(S^2 + W_{Z2}^2)(S)}{\left(S^2 + W_{P1}\frac{S}{Q_1} + W_{P1}^2\right)\left(S^2 + W_{P2}\frac{S}{Q_2} + W_{P2}^2\right)\left(S^2 + W_{P3}\frac{S}{Q_3} + W_{P3}^2\right)}$$

WHERE
$W_{Z1} = 2\sim(550)$;
$W_{Z2} = 2\sim(750)$;
$W_{P1} = 2\sim(463)$;
$Q_1 = 4$;
$W_{P2} = 2\sim(463)$;
$Q_2 = 4$;
$W_{P3} = 2\sim(302)$; and
$Q_3 = 2.5$.

In order to suppress the high-frequency components of the signals passing through filters 242 and 244, the lowpass filter 253 should have a transfer function $H_3(S)$ which obeys the relation:

$$H_3(S) = \frac{1}{\left(S^2 + W_{P1}\frac{S}{Q_1} + W_{P1}^2\right)}$$

WHERE $W_{P1} = 2\sim(3100)$ and $Q_1 = 0.87$

As seen in FIG. 2, input of lowpass filter 252 is connected, in the high-speed mode, by the switch 234 to either the output of wideband filter 242 or the output of narrowband filter 244, depending on whether the modem is transmitting over the forward channel or the backchannel respectively. In either case, filter 252 suppresses the level of high-frequency signals applied via the line circuit 220 to the telephone lines 115. Signals being received via the telephone network do not require lowpass filtering and are passed directly to the switch 232 which selects the appropriate receiving filter output (switch 231 having selected the input of the same filter for reception). The switches 231-235 are controlled by Supervisor 101 acting over control link 121. As an example, the switches 231-235 are shown in FIG. 2 positioned as they would be if the modem were transmitting over the high-speed forward (9600 bps) channel and receiving over the narrowband backchannel. Note that, in the example switch settings shown in FIG. 2, the lowpass filter 252 is serially connected with the wideband filter 242 between the input to switch 235 and the output of switch 233.

The received signals from switch 232 are passed via an automatic gain control (AGC) circuit 260 and the line 181 to the input of sample-and-hold circuit 170 (seen in FIG. 1). The AGC of the present embodiment has an amplitude dynamic range of 45 db., an RMS voltage output of 600 millivolts, and a time constant of 15 milliseconds for the forward channel and a longer time constant of 1.5 seconds when used with the back-channel (the output response time of the AGC 260 is controlled by the Supervisor 101 to correspond to the operating mode of the modem).

During transmission, the analog output signal developed by the DAC 175 seen in FIG. 1 is passed via line 182 to the switch 235 which connects line 182 to the input of one of the filters 242-248. The output of the low-speed filters 246 and 248, when they are used for transmission, is passed via the switch 233 to the line network 220. When the modem is operating in its high-speed mode, the output of either filter 242 or 244 is additionally passed through the filter 252 as noted earlier as determined by switches 233 and 234.

The telephone interface arrangement 104 shown in detail in FIG. 2 also develops a pair of additional line monitoring signals: a *CALL PROGRESS SIGNAL* developed by the threshold amplifier 280 and a *CARRIER DETECT* signal produced by the combination of a rectification circuit 291, a lowpass filter 292 and a threshold detector 293. Both of these status signals are passed via the control linke 121 ro the Supervisor 101. The lowpass filter 292 should have a transfer function $H_4(S)$ as defined by the following relation:

$$H_4(S) = \frac{1}{(S + W_{P1})}$$

where $W_{P1} = 2\sim(1591)$ for reception on the forward channel (defined by filter 248) and where $W_{P1} = 2\sim(30)$ for reception on the backchannel (defined by filter 244). The cutoff frequency of the lowpass filter 292 is adjusted by a signal supplied from Supervisor 101 over control link 121.

Synchronization

As noted earlier in connection with the discussion of the preferred linear topology of the three processors 101, 102 and 103 seen in FIG. 1, the three processors exchange information via their respective I/O ports as illustrated by the bus connections 111 and 113 in FIG. 1. Communication between the processors is synchronous and is initiated by the Receiver 101 which is periodically interrupted by a hardware timer. The Receiver 103 first reads the data at the port to bus 113, writes any pending data back to that port, and then interrupts the Transmitter 102 (See FIG. 3).

The Transmitter 102 responds by reading the data supplied via bus 113 and then writing any new command to be passed to the Receiver 103. Recall that commands to both the Transmitter 102 and the Receiver 103 originate with the Supervisor 101, and the commands that are destined for Receiver 103 are passed through Transmitter 102 which operates as a messenger. A timer interrupt in the Transmitter 102 causes it to read the data supplied to the port connected to Supervisor 101 via bus 111, to then write the appropriate response back to the same port, and then to interrupt the Supervisor 101.

The Supervisor 101 responds by reading the port connected to bus 111 and then writing any command or data to the same port.

Figure 3:
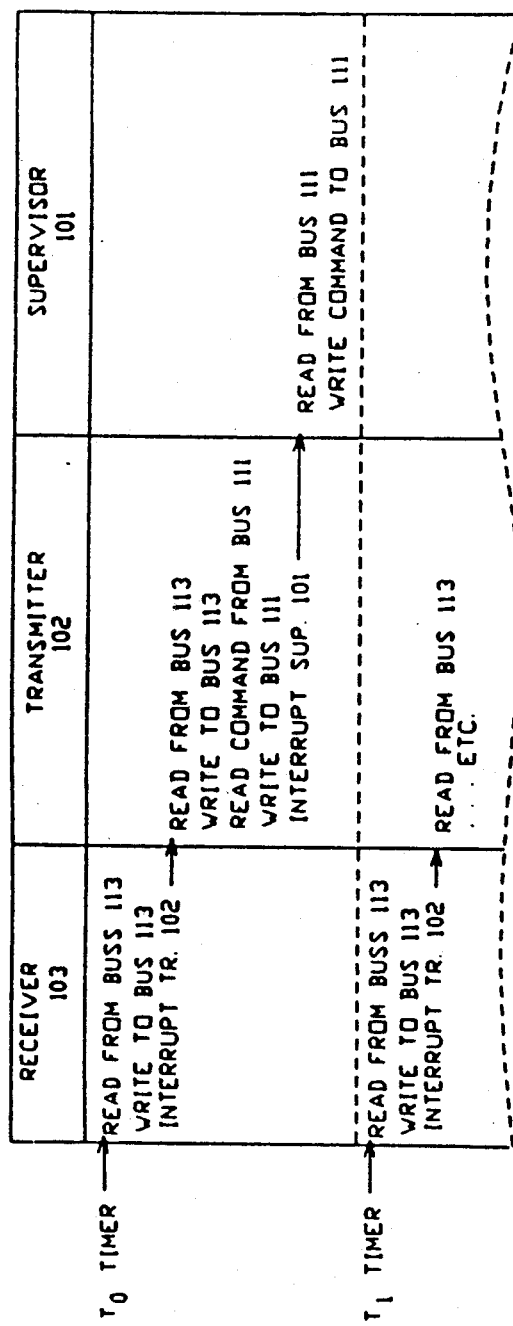
FIG. 3 is a chart which illustrates the interrupt driven sequence of events by which interprocessor communications are synchronized in the modem of FIG. 1.

This method of synchronizing the three processors is shown graphically in FIG. 3 of the drawings. It may be noted that, using this mechanism, each of the three processors has essentially the full cycle time (the duration between two consecutive interrupts as illustrated by $T_0$ and $T_1$ in FIG. 3) in which to complete its processing task; consequently, processor collisions are unlikely since the Transmitter 102 and Supervisor 101 need only read their respective ports before the next interrupt occurs. Moreover, it is unnecessary for the processors to acknowledge interprocessor commands.

Supervisor 101

Although the modem is synchronized by the timer interrupt which is supplied the Receiver 103, the high-level control of the modem is provided by the Supervisor 101, which executes routines which will be generally described below.

Before describing generally describing individual routines and other mechanisms, the overall function of the modem will be summarized.

User Commands

The present modem supports an extended version of the industry standard "AT Command Set" and the various commands from the DTE to which the modem responds are summarized in the following listings. The first listing summarizes the standard commands and the second listing summarizes the extensions to the command set which have been employed in connection with additional functions, such as software and data rate control, flow control, error control and control over the non-volatile memory (NRAM) used to store user-defined parameters and default values.

AT Standard Commands Summary

A Force Answer Mode when modem has not received an incoming call.
A/ Re-execute last command one time. AT prefix not required.
A> Re-execute last command continuously until cancelled. AT prefix not required.*
AT Attention. Mandatory command prefix except for A/, A> and +++.
Bn Switch between U.S. and CCITT answer sequence.*
  B0—CCITT (overseas)*
  B1—US (default)*
Cn Transmitter enabled/disabled
  C0—transmitter disabled (receive only mode)
  C1—transmitter enabled (default)
D Dial the number that follows. Options are specified by the following
  P—pulse dialing
  T—tone dialing
  ,—pause for two seconds
  ;—return to command mode after dialing
  "..."—dial the letters that follow
  !—transfer call (flash the switch hook)
  W—wait for second dial tone (options X3 or higher, see X below)
  @—wait for answer
  R—reverse frequencies (answer becomes originate)
  Sn—dial number stored in NRAM at location n*
En Command Mode local echo—dip switch sets "factory default"
  E0—echo OFF
  E1—echo ON
En Online local echo (duplex setting)
  F0—online echo ON (half duplex)
  F1—online echo OFF (full duplex, default)
Hn On/off hook control
  H0—hang up
  H1—go off hook
In Inquiry—display one of following
  I0—product code
  I1—ROM checksum results
  I2—RAM test results
  I3—call duration or real time (see Kn)
  I4—current modem settings
  I5—current NRAM settings
  I6—link diagnostics
Kn Modem clock operations
  K0—return call duration in response to I3, supra
  K1—return actual time in response to I3, supra
Mn Speaker control
  M0—speaker always OFF
  M1—speaker on until carrier established
  M2—speaker always ON
  M3—speaker ON until last digit dialed and carrier established
O Go online after command execution
Qn Quiet mode
  Q0—result codes displayed
  Q1—result codes suppressed
Sr=n S-Register commands where r is register number and n is 0–255
Sr? Display contents of register r
Vn Return code format
  V0—return numeric codes
  V1—return verbal codes
Xn Result code options
  X0–X7 selects which subset of possible codes are to be returned
Z Reset modem to NRAM settings
+++ escape to command mode
& extended commands (see summary to follow)
$ Help command summary request
D$ Help summary of dialing commands
S$ Help summary of S-register usage
Ctrl-S Help screen stop/restart toggle
Ctrl-C Help screen display cancel
Ctrl-K Help screen display cancel

At Extended Commands Summary

&An ARQ result code enable/disable*
  &A0—suppress ARQ result codes
  &A1—display ARQ result codes
&Bn Terminal/modem data rate
  &B0—DTE/DCE rate follows link connection rate (default)
  &B1 DTE/DCE rate fixed at DTE setting (19.2k, 9600, 2400, 1200, 300)
&F Load factory default (rom settings) into RAM~

&Hn Transmit data flow control
  &H0—disabled (default)
  &H1—hardware (CTS, pin 5) flow control
  &H2—software (XON/XOFF) flow control
  &H3—hardware and software control
&In Receive data flow control
  &I0—disabled (default)
  &I1 XON/XOFF sent to both local modem and remote system
  &I2—XON/XOFF to local modem only
  &I3—Host mode (Hewlett Packard protocol)
  &I4—Terminal mode (Hewlett Packard protocol)
&Mn Error control mode
  &M0—Normal mode (error control disabled)
  &M1-M3—not used
  &M4—Attempt ARQ connection, then switch to normal if not possible
  &M5—ARQ mandatory (hang up if ARQ connection cant be made)
&Nn Link data rate
  &N0—normal-negotiate highest available speed with remote modem
  &N1—300 bps
  &n2—1200
  &N3—2400
  &N4-5—reserved
  &N6 9600
&Pn Dial pulse make/break ration
  &P0—North American standard (default)
  &P1—British Commonwealth standard
&Rn Received data hardware flow control
  &R0—reserved
  &R1—ignore RTS (default)
  &R2—Received data to terminate on RTS high
&Sn DSR (Pin 6) override
  &S0—DSR always ON (default)
  &S1—modem controls DSR
&W Write current settings to NRAM~
&Yn Break handling. Destructive breaks clear the buffer. Expedited breaks are sent immediately to the remote modem.
  &Y0—destructive (don't send break)
  &Y1—destructive, expedited
  &Y2—Non-destructive, expedited
  &Y3—non-destructive, non-expedited
&Yn=s Write dial string s to NRAM at location n
&Zn Display phone number in NRAM at location n~

Supervisor 101 Routines

The Supervisor 101 responds to the above-noted commands and provides the high-level control over the modem. The procedures for reading and writing data between the Supervisor 101 and the serial port 101 and for managing the buffer are contained in the serial interrupt handler SERIAL.

The Supervisor 101 additionally controls and responds to the serial port 114 by sending and receiving signals on its various control lines, and controls other portions of the modem including particularly the analog telephone interface network 104 which is controlled via control lines (indicated diagrammatically by 121 in FIGS. 1 and 2). The software/hardware interface for these controls is provided by the individual pins of the data ports of the Supervisor 101 as set (and read) by the interface routines listed in XIO.

AT commands from the DTE supplied to the Supervisor 101 via the serial port 114 are handled by the routine PARSE which interprets the command and calls the appropriate routine for performing the requested function. Additional command line parsing and user interface procedures are contained in the collection of subroutines named SUBS.

For modem users who may be unfamiliar with the form and function of the various standard and extended AT commands listed earlier, the command $ (as detected by PARSE) causes the modem to send back to the DTE, for display on the user's screen or console, a basic summary of the AT commands, while &$ produces a summary of the extended commands, D$ produces a summary of the dial commands and S$ produces a summary of the S-register commands. The procedure PUTSTRING in the routine HELP sends the requested summary to the DTE and the code for the summaries themselves is also contained in the routine HELP.

The Supervisor 101 is provided with a read only memory for program storage and for the storage of a variety of "factor default" values for use by the software. The modem further advantageously includes a programmable, non-volatile random access memory (NRAM—not shown in the drawings) for storing a number of user-defined default values. When the modem is powered ON, these user-defined default values are loaded from NRAM for use by the software, or alternatively the factory-defined defaults in ROM storage are loaded, depending on the setting of a DIP-switch option. The parameters which may be stored in the NRAM may be displayed at any time by means of the Inquiry AT command 15. The routine NOVRAM contains the program for managing the default values and the NRAM memory.

In addition to selecting the appropriate default parameters, the Supervisor 101 also executes the initialization routines contained in the routine RESET upon power up and after the receipt of the AT reset command ATZ (which also resets the modem to the NRAM or ROM defaults).

The overall supervision of the modem when operating in its high-speed (9600 bps) mode is handled by the routine HS while the routine LS handles the same function for the low-speed (300, 1200 and 2400 bps) modes. The routine LS also handles the initial "handshaking" which takes place with the remote modem.

It is the task of the Supervisor 101 to monitor certain conditions in the "outside world" as evidenced by the signals appearing at the serial port 114 to the DTE and at the telephone line circuit 115. To do this rapidly and without significant additional hardware, the present invention makes use of the hardware timer/counters built into the Supervisor 101 8031 processor to provide signal detection services without tying down the processor itself. The timer/counters are used to provide call monitoring functions (handled by the CALLP routine) and to detect the rate at which data is being supplied from the DTE via the serial port 114 (handled by the AT_DETECT routine.

Call Progress Detection

Supervisor 101, working with analog signal detection circuits, monitors the status of the telephone line and includes a mechanism for detecting and distinguishing between answer tones generated by the remote modem, voice signals, dial tones, ring back signals, and busy signals.

This mechanism utilizes two signals developed by the analog telephone network 104 seen generally in FIG. 1 and described in detail in connection with FIG. 2. The two signals are the CALL PROGRESS SIGNAL produced at the output of threshold amplifier 280, and the CARRIER DETECT signal produced at the output 295 of the threshold amplifier 293. The CALL PROGRESS SIGNAL is a two level (e.g. 0 or 5 volt) signal depending upon whether the received signal from the telephone is above or below a predetermined threshold level.

By counting the number of transitions from level to level of the CALL PROGRESS SIGNAL during an interval of predetermined duration (such as 100 milliseconds), it is possible to obtain a measure of the average (principal) frequency of the signal.

Secondly, the CARRIER DETECT signal provides a second two-level logical signal which indicates whether or not the full-wave-detected (absolute value) of the received signal within the passband of the low-pass filter 292 is above or below the threshold level applied the threshold input 294 of the threshold amplifier 293.

The frequency determination is made by employing a hardware timer/counter (Timer 0) built into the 8031 processor utilized to implement the Supervisor 101. The CALL PROGRESS signal is applied to pin p3.4 of the 8031 Supervisor processor and the CARRIER DETECT SIGNAL is applied to pin p3.5. As seen by the routine entered at GETFREQ in the listing for CALLP (which shows all of the call progress code executed by the Supervisor 101), the 8031's TIMER 0 is set to monitor the CALL PROGRESS SIGNAL and counts transitions in that signal for a 100 millisecond period. During the same period, the CARRIER DETECT signal at pin p3.5 is monitored to verify that a high-level signal is present at each ten millisecond interval within the overall 100 millisecond interval during which that Timer 0 is counting CALL PROGRESS SIGNAL transitions.

The resulting frequency count is then used to indicate the line status in accordance with the following algorithm:

(1) if the frequency is between 2150 and 2500 Hz, an ANSWER TONE is deemed to be present;
(2) if the frequency is between 1130 and 2000 Hz, and continues for 4 100 millisecond periods (0.4 seconds), a VOICE signal is indicated;
(3) if the frequency is between 300 and 800 Hz and continues for more than 2.7 seconds (27 periods) then a DIAL TONE is indicated;
(4) if the frequency is between 300 and 800 Hz., and exists for at least 0.7 seconds (7 periods) but less than 2.7 seconds, a RING BACK signal is detected; and
(5) if the frequency is between 300 and 800 Hz., and exists for between 0.2 and 0.6 seconds (2-6 periods in a row), followed by an indication of frequency count of less than 100 Hz. for at least one period, and that pattern happens 2 times in a row, a BUSY signal is indicated.

Baud Rate Detection

The Supervisor 101 also uses the internal hardware timer/counter Timer 0 to automatically detect the rate at which data is being supplied to the modem via the standard RS-232C serial port (seen at 114 in FIG. 1) from the connected computer ("Data Terminal Equipment" or "DTE"). Baud rate detection is accomplished by using the internal counter Timer 0 in Supervisor 101 to measure the width of the start bit in the "A" character of each "AT" command received from over the serial port 114.

The AT routine executed by Supervisor 101 sets Timer 0 in the Supervisor 101 8031 processor to start counting at the beginning of each start bit (the main loop for doing baud rate sensing (ONLINE_JMP) repeatedly calls the procedure ONLINE_CHECK. The routine AT_REGULAR sets Timer 0 so that it will be gated OFF by the trailing edge of the start bit from the serial port, and then begins counting after resetting Timer 0 to a zero value. The resultant count is then available when it is determined that the start bit measured is the leading start bit in the AT command, to provide a measure of the serial port speed.

By utilizing a hardware timer which is directly controlled by the start bit, it is possible to detect higher baud rates (shorter start bits) up to the 19200 bps maximum port speed, a rate which could not be detected if the processor were to take repeated samples of the received data line and perform the count in software. In the illustrative embodiment, Timer 0 of the 8031 Supervisor processor is set up as a gated timer (by the statement MOV TMOD,#00101001b in AT_REGULAR) which then directly controlled by the start bit from the data port (which is inverted and applied to processor pin p3.4 [CD_PIN]). In this way, Timer 0 is turned ON by the SETB TR0 statement in AT_REGULAR and then is gated OFF at the trailing edge of the start bit to form the basis for the baud rate calculation.

Data Compression

In order to increase the effective rate of data transmission (at a given baud rate), the data to be transmitted may be "compressed" using known methods at the transmitting modem, and expanded again into the original data sequence at the receiving modem. In the disclosed embodiment, the routine ENCODE executed by the Supervisor 101 provides such data compression using the standard MNP Level 5 compression technique.

Data Rate and Flow Control

The detected rate at which the DTE is sending information to the modem is used, along with other information, to ultimately determine the rate at which data will flow over the phone lines. The mechanism for compensating for the differences in the data flow rates between the phone link and the modem on the one hand, and between the modem and the DTE on the other, is generally called "flow control" and is enabled by means of the transmit data flow control commands (&Hn) and received data flow control commands (&In, &Rn), by which the user can specify whether the flow control commands between the modem and the DTE are sent via hardware control lines (CTS for transmit and RTS for receive), or by means of software control (XON/XOFF signals sent via the data line). Using the &Bn command, the user can set the data rate between the DTE and the modem to follow the phone link rate, or to be fixed at the DTE rate as determined by the AT_DETECT routine. Similarly, using the &Nn commands, the user can instruct the modem to use a predetermined phone line rate, or to operate in the normal (&N0) mode in which the highest rate is negotiated with the remote modem.

Initially, the modem detects its rate be detecting the rate at which the AT command is sent by the DTE using the routine AT_DETECT. (That rate is determined by the setting of the DTE itself, for example by a "mode" command in computer operating under MS/PC-DOS). When originating or answering a call, the modem and the remote modem negotiate the highest possible link rate. For example, if the AT_DETECT routine detects an AT command at 9600 bps and the modem calls a remote modem which is operating at 1200 bps, the originating modem automatically falls back to 1200 bps, and notifies the DTE of the link rate by sending a result code (e.g., "CONNECT 1200") to the DTE. When the modem re-enters the command mode (typically in response to a "+++" escape to command mode signal being detected in the data stream), it again detects the data rate on the serial port when the next AT command is received and returns to that rate (9600 bps in the example).

If the flow rate on the phone link is lower than the data rate at the serial port, the modem buffers the data from the serial port to enable the phone link to catch up. The modem monitors how full the buffer is, and sends the agreed (hardware or software) flow control command to the DTE to terminate the receipt of further data until more room is available in the buffer.

Dynamic Direction Assignment

The foregoing control mechanism controls the flow of data over the serial link. Still another mechanism for managing the flow of data occurs on the data link itself when the modem is operation in its asymmetric, high-speed mode in which data is sent at 9600 bps in one direction over the wideband channel (defined by forward channel filter 242 seen in FIG. 1) and at 300 (or 450 bps) in the opposite direction over the backchannel defined by filter 244 (FIG. 1). This mechanism, which operates automatically, is illustrated in FIG. 4 of the drawings.

Figure 4:
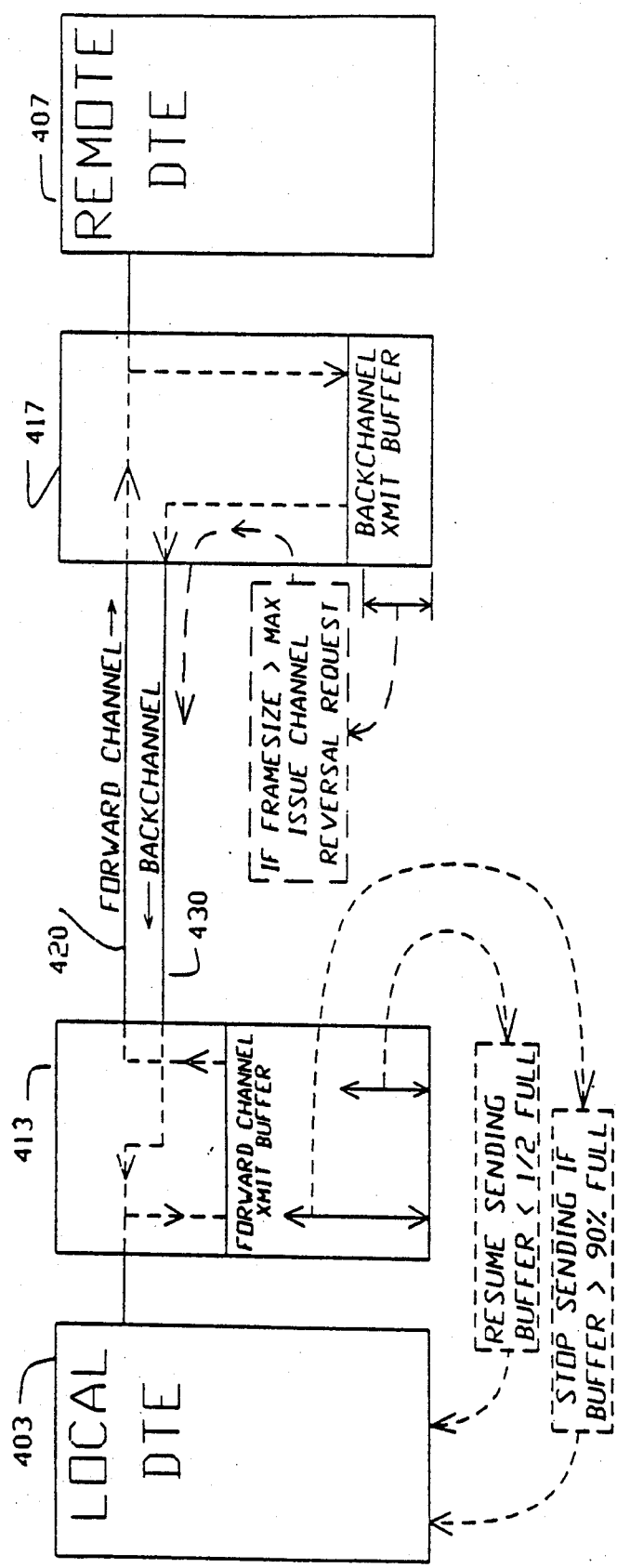
FIG. 4 is a block diagram which illustrates the manner in which the forward and backchannels of the modem of FIG. 1 are switched in the high speed mode in response to the leve of demand placed on the backchannel.

As seen in FIG. 4, a local DTE 403 is shown communicating with a remote DTE 407 by a link created by the local modem 413 and the remote modem 417. These two modems are shown operating in the high speed mode with local modem 413 sending over the high speed channel (illustrated by the path 420) at 9600 bps. and receiving over the backchannel illustrated at 430 at 300 bps.

Since the local modem has been assigned the highest speed channel for transmission, it merely needs to monitor the amount of data in its forward channel transmit buffer to insure that burfer is not being overloaded. As seen in FIG. 4. if the forward channel buffer becomes filled to more than 90% of its capacity, it signals the connected DTE (by lowering CTS in hardware, or with a software XOFF singal) to stop sending data until the modem catches up. When the transmit buffer is emptied to less than half-full, the modem 413 signals the DTE 403 to resume transmitting.

At the remote end, the modem 413 also monitors the amount of data pending for transmission in the reverse direction over the backchannel 430. As will be discussed later, under the extended MNP protocol used in the present inventon, data is transmited in frames over the backchannel and largest frame that can be sent contains 64 bytes. In the event that more than 64 bytes of data is ready to be sent over the backchannel, the modem using the backchannel for transmission just verifies that the far modem has had the benefit of the high speed channel for transmission for at least a predetermined minimum period of time (e.g. 2 seconds), and if it has, the backlogged modem issues a link command (a type 4 LN Link Protocol Data Unit to be described below) to initiate a direction reversal, which is essentially transparent to the remainder of the link management protocol.

Extended Link Protocol

The routines for supervising the transmission of information under the extended MNP protocol are found in the routine XMNP which is executed by the Supervisor 101.

In the standard MNP protocol, all data transmissions take place in groups formally termed "Link Protocol Data Units" (LDPU's) or simply "frames". In standard MNP, there are six types of frames:
(1) Link Request (LR) which communicates link-connection parameter information;
(2) Link Disconnect (LD) which signals termination of the data link and communicates the source and reason for the disconnection;
(3) Link Data (LT) is the frame which transfers link-user data over the link to another user;
(4) Link Acknowledgment (LA) which indicates the correct or incorrect receipt of data from the link, and which also sends flow-control information;
(5) Link Attention (LN) which is used to communicate a signal from one link-user to another; and
(6) Link Attention Acknowledgment (LNA) which acknowledges the receipt of an LA frame.

As in all error checking protocols, the standard MNP protocol maintains a continuous dialogue between the two ends of the data link to insure the integrity of the data transmission. Error detection is achieved by dividing the information into the above-noted LPDU's or frames, each of which begins and ends with a unique flag codes and each of which includes CRC (cyclic redundancy checking) codes. In standard MNP as well as in the protocol used in connection with the present invention, every frame of data being sent is processed by a cyclic algorithm which computes a 16-bit check value and inserts it into the frame being transmitted. At the receiving end, the same cyclic computation is performed on the received data and the resulting computed value is then compared against the received check value. The receiving station then transmits either a positive or negative acknowledgment based on the result of the comparison. If errors are detected, the receiving station accepts no more data until the defective frame is retransmitted and correctly received.

As will be noted later, the detection of errors in more than a predetermined number of consecutive LPDU's (frames) at the high-speed receiving modem causes that modem to transmit, over the low-speed channel, a request for a reduction in the high-speed transmission rate.

Under standard MNP, data is transferred over the link using the Link Data (LT) and Link Acknowledgment (LA) frames in a two-way exchange. In the simplest case, one LT frame is sent in a first direction over the link and an LA frame is then returned in the opposite direction over the link to communicate correct receipt of the LT frame. In the more general case, a single LA may acknowledge the receipt of several LT frames. Moreover, in addition to simple data transfer over the link, additional mechanisms control the flow of data to pace transmission so that the receiver is not overwhelmed with data, and a retransmission mechanism is employed to prompt the sender to retransmit frames which were received in error. These mechanisms are described in detail in the literature, including the MNP NETWORK SPECIFICATION, VERSION 1.0 (Version 1.0 dated 15 Aug., 1983), by Microcom, Inc., 1400A Providence Highway, Norwood, MA 02062. See also, ONE FILE-TRANSFER PROTOCOL SERVES ALL PERSONAL COMPUTERS, by James Dow, *Electronics,* Vol. 16, N. 16 (Aug. 11, 1983).

Improved error-rates are achieved under the control of an extension of this MNP link protocol without the degradation in speed exhibited by other systems. The use of trellis coded modulation (TCM) makes the data transmitted less vulnerable to errors cause by telephone network impairments (TCM as commonly implemented today can tolerate more than twice the telephone channel noise power as conventional quadrature amplitude modulation and consequently requires fewer error-correcting transmissions). Moreover, the asymmetric architecture of the system (a wide forward passband and narrow backchannel passband) allows error-control retransmission requests to be sent from the high-speed receiver to the high-speed transmitter without requiring the "ping-ponging" direction reversals which characterize of half-duplex systems.

As described in Wallach et al. Application Ser. No. 07/115,354, the control protocol used for error signalling over the limited bandwidth backchannel allows the backchannel to simultaneously supervise the operation of the high speed forward channel while handling interactive communication (at keyboarding speeds). The error control protocol used is compatible with, and represents an extension to, the Microcom Networking Protocol (MNP) which is widely used in the industry, particulary in 2400 bps systems, and which is described in *MNP Networking Protocol Specification,* cited above. To reduce signalling overhead, frame formats have been streamlined to eliminate redundant bytes and new frame types not present in the standard protocol have been added for use on the back channel.

The basic structure and operation of the standard MNP protocol operates in the usual way in the embodiment disclosed here and, with the exception of the differences noted below, standard MNP rules and formats are followed. The differences will be more apparent by comparing the frame formats of the present, extended version (depicted in FIG. 5 of the drawings) with standard MNP formats. In particular, it may be noted that:

Frame formats are streamlined to eliminate redundant bytes. This is similar to standard MNP level 4, except that the process applies to all frame types, and the first Length indicator byte found in standard MNP has been removed.

Several new frame types are added to the extended version used by the present modem; namely, the NAK, the LTA, and (for the back channel only), LT1, LT2, LT3, LTR, LTDR. Various new Link Attention types (LN) are added to handle the line reversal and data rate switching.

The newly added NAK frame functions as a double ACK frame. It implies that the particular LT was the last correctly received, and that later incorrectly sequenced LTs were detected.

The newly added LTA is a combined Data frame (LT) and Ack frame (LA). Its purpose is to provide extra bandwidth for the back channel, and improved efficiency.

The LT1 is only transmitted by the backchannel. It is a fixed size data frame with only one (1) data byte. The lower 4 bits of the LT sequence number is sent in the upper nibble of the frame id byte as shown in FIG. 5.

The LT2 is only transmitted by the backchannel. It is a fixed size data frame with only two (2) data bytes. The lower 4 bits of the LT sequence number is sent in the upper nibble of the frame id byte as in the case of the LT1 format.

The LT3 is only transmitted by the backchannel. It is a fixed size data frame with only three (3) data bytes. The lower 4 bits of the LT sequence number is sent in the upper nibble of the frame id byte.

The LTR and LTDR are only transmitted by the backchannel. These are fixed size data frames with a special meaning: repeat(or double repeat for the LTDR) the last data frame. They are sent only if the last data frame was <5 bytes. In order to increase the Hamming distance of the FCS, A phantom 0FFH is shifted into the CRC before transmitting it. This is done only because of the extremely small size of the frame.

Whenever a LT1, LT2, LT3, LTR, LTDR has to be retransmitted, it is reformatted into a standard LT frame. Because these frame types are fixed length, the receiver doesn't wait for the closing flag. It checks the first byte in a frame for one of the above types. If it is, then it verifies the CRC without waiting for the closing flag. This allows a reduction in the transfer time.

These frame types were added to decrease the round trip delay under interactive applications. Most use of the backchannel is likely to be for interactive use. The LTR and LTR are intended for cases when a human holds down a key, and it auto-repeats. Many terminals have arrow keys that generate a two or three char escape sequence, literally starting with the ascii ESC char. So when the back channel transmitter detects an ESC, it waits a few ms to determine if a valid ECS sequence is pending. The LTR and LTDR help to keep up with repeated arrow keys.

A LN type 4 indicates a channel reversal at the current speed. It is sent by the back channel. A LNA is sent at the current speed, and then the reversal takes place.

In accordance with the present invention, two additional *****

The formats for all of the above-discussed LPDUS is graphically shown in FIG. 5 of the drawings.

Transmitter 102 Routines

All of the routines performed by the 8051 Transmitter processor 102 are contained in the Transmit module TR which is listed in full at the conclusion of this specification.

These routines perform initialization, the transfer of commands and data between the Supervisor 101 and the Receiver 103, and the interpretation of commands from the Supervisor 101 to the Transmitter 102. In addition, the routines in the TR module perform ring detection and dial tone generation.

The main task of the Transmitter 101 is the conversion of bits from the DTE into a digital signal which is supplied via the bus 123 to the DAC 175 (FIG. 1) for conversion into analog form for transmission.

The routine TR, when operating in its low speed mode, converts the digital information from the DTE into compatible 300, 1200 and 2400 (V0.22bis standard) signals for transmission over the phone lines. In its high speed mode, the TR routine performs the trellis encoding function specified in the V0.32 standard (see "A FAMILY OF 2-WIRE, DUPLEX MODEMS OPERATING AT DATA SIGNALLING RATES OF UP TO 9600 BITS/S FOR USE ON THE GENERAL SWITCHED TELEPHONE NETWORK AND ON LEASED TELEPHONE-TYPE CIRCUITS, CCITT Recommendation V0.32 (Malaga-Torremolinos, 1984).

Receiver 103 Routines

The Receiver 103 is a high speed floating point processor whose principal function is low-level processing of the received signal, converting the received signal samples from the ADC 173 into the bit stream to be sent to the DTE. In the high speed mode when the modem is transmitting on the high speed channel and receiving on the low speed back channel, the Receiver 103 assists the Transmitter 102 by doing some of the high speed transmitted signal filtering (it acts as a slave math processor and performs the routine MOD96 in this mode).

The routine labeled 24MERC performs the data pump demodulation function at the lower speeds; that is, reception at 300, 1200 and 2400 bps, as well as reception over the 300 bps backchannel in the high speed mode.

When Receiver 103 is receiving the high speed 9600 bps signal, it performs the routines listed under the headings DEMOD and VA in the assembly language which follows. VA is the routine for performing the "Viterbi Algorithm," the decision used logic used to perform the inverse trellis function defined in the V0.32 standard, while the routine DEMOD contains the 9600 demodulator or "data pump" code.

In accordance with the present invention, the Viterbi Algorithm (performed by Receiver 103 executing the routine VA during high-speed operation at 7200 bit/s and higher) produces a quantitative value, called the Viterbi "error metric," which provides a figure of merit for the communication channel. The routine Va, and more specifically the routine RENORM, forms the sum (having the symbolic name SUM) of sequential metric values. This metric value is compared to a predetermined threshold level and, if the comparison indicates that the line quality is good, a boolean value (called RSCATTER as indicated in the module HS) is passed to the Supervisor 101.

At 4800 bit/s, the incoming signal is not trellis coded; consequently, the Viterbi metric value cannot be used to indicate the desirability of attempting a speed increase. Instead, the equalizer eyescatter value developed in the Receiver 103 by the module DEMOD is used. The real component of the eyescatter value is stored in ERRR and the imaginary component is stored in ERRI, and either may be checked against a predetermined level to generate the value RSCATTER used by the Supervisor 101 in module HS.

The procedure beginning at CHECK_BLER in the module HS executed by the Supervisor 101 monitors the boolean bit RSCATTER generated by the Receiver 103 to determine when a speed-up should be requested. Decisions about upshifts are made at 10 second intervals. If the signal quality, as indicated by RSCATTER is good for 90% of that 10 second interval, a speedup is requested.

A speed reduction may be initiated when the modem is unable to retrain itself at a given speed. The procedure UPRET1 in the Receiver module DEMOD monitors retraining attempts, and the procedure DETERMINE_FALLBACK in the Supervisor Module HS counts failed attempts to retrain, and initiates a speed reduction whenever three failed attempts are made in a ten second interval.

The procedure beginning at CHECK_BLER in HS also monitors the "broken frames" to determine whether a speed reduction should be initiated (both CRC frame errors as well as 50 millisecond long blocks of fill characters which are treated as frames when no MNP frames are being received). CHECK_CRC in HS checks for valid frames, and the routine DO_LN in module HS sends speed change request messages via the low speed backchannel. Speed reductions are requested whenever 15 frame errors occur within a given 10 second interval. These ten second intervals are commence upon the first occurrence of an error, so that prolonged error free operation will no initiate a checking interval.

The speed change request message sent by the routine DO_LN over the low speed back channel takes the form of a MNP protocol link attention frame LN where the frame's TYPE field indicates the action to be taken (the type values, called attention codes the equate listing in the HS module) include the following examples:

Attention Codes

| | |
|---|---|
| atn_reverse_9600 equ 14h | (requesting a high speed channel reversal at 9600 baud) |
| atn_retrain_7200 equ 23h | (requesting a speed fall-back to 7200 baud, accompanied by a retraining attempt) |
| atn_upshift_9600 equ 34h | (requesting a speed increase to 9600 baud) |

The LN message frames received over the low speed channel by the high speed transmitting modem are handled by the procedure MANAGE_LN in the Supervisor module XMNP. A request for a high speed transmission rate change is a mandatory command which is executed as follows: at the conclusion of the frame currently being transmitted, a 15 millisecond sustained mark signal is sent to over the high speed channel at the current speed, followed by a 15 millisecond constant mark signal at the newly requested speed. Note that, under the MNP protocol, the constant mark signal is not otherwise sent, since fill characters having unique value are sent when no data frames are being transmitted.

What is claimed is:

1. A modem for connecting digital data terminal equipment to an analog communication link comprising, in combination,
   frequency division filtering means serially connected with said link for establishing a high speed channel having a bandwidth in a first range of frequencies and a low speed channel having a bandwidth in a second and more limited range of frequencies,
   digital-to-analog conversion means connected between said equipment and said filtering means for translating digital signals from said equipment into analog signals for transmission over said link in a selected one of said high or low speed channels,
   analog-to-digital conversion means connected between said equipment and said filtering means for producing digital signals supplied to said equipment from the analog signals received over the other one of said channels, and
   means operative when said digital-to-analog conversion means is transmitting data over said low speed channel for sending a rate change request signal over low speed channel to request a change in the rate of data transmission over said high speed channel.

2. A modem as set forth in claim 1 wherein said means for sending a rate change request comprises means for detecting the transmission of incorrect data over said high speed channel and for generating a request for a lower high speed channel transmission rate in response thereto.

3. A modem as set forth in claims 1 or 2 further comprising means for transmitting over said low speed channel a request for a faster transmission rate on said high speed channel.

4. A modem as set forth in claims 1 or 2 comprising means for subdividing data being transmitted on said high speed channel into frames of data each of which includes error checking data, means for verifying the accuracy of transmission of each of said frames during its transmission over said high speed channel, and means for transmitting over said low speed channel a request for a lower high speed channel transmission rate whenever more that a predetermined number of said frames contains a transmission error within a predetermined interval of time.

5. In an asymmetrical data communication system of the class comprising a modem at each end of a telephone transmission link, each of said modems being capable of transmitting and receiving modulated data over said link simultaneously in two frequency-divided channels, the first of which is a wideband high speed channel and the second of which is a low speed channel of greatly reduced bandwidth, adaptive control means for varying the rate of transmission over said high speed channel in response to variations in the quality of said link which comprises, in combination, means at the modem receiving data over said high speed channel for generating a fault condition signal in response to the detected occurrence of errors in the transmission of data over said high speed channel, and means responsive to said fault condition signal for transmitting a rate reduction request signal over said low speed channel to the modem transmitting over said high speed channel.

6. Adaptive control means as set forth in claim 5 including means at the modem transmitting over said high speed channel for transmitting a new rate command over said high speed channel in response to the receipt of said rate reduction request over said low speed channel.

* * * * *